(12) United States Patent
Zhang et al.

(10) Patent No.: US 10,739,646 B1
(45) Date of Patent: Aug. 11, 2020

(54) LIQUID CRYSTAL ON SILICON DEVICE MIRROR METAL PROCESS

(71) Applicant: OmniVision Technologies, Inc., Santa Clara, CA (US)

(72) Inventors: Ming Zhang, Fremont, CA (US); Yin Qian, Milpitas, CA (US); Libo Weng, San Jose, CA (US); Dyson H. Tai, San Jose, CA (US); Chia-Ying Liu, Hsinchu (TW); Chia-Jung Liu, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/399,373

(22) Filed: Apr. 30, 2019

(51) Int. Cl.
*G02F 1/1337* (2006.01)
*G02F 1/1335* (2006.01)
*G02F 1/1362* (2006.01)

(52) U.S. Cl.
CPC .... *G02F 1/13378* (2013.01); *G02F 1/133553* (2013.01); *G02F 1/136277* (2013.01); *G02F 2202/105* (2013.01)

(58) Field of Classification Search
None
See application file for complete search history.

(56) References Cited

U.S. PATENT DOCUMENTS

| | | | | |
|---|---|---|---|---|
| 9,921,442 | B2 * | 3/2018 | Qian | G02F 1/136 |
| 2008/0291373 | A1 * | 11/2008 | Liu | G02F 1/133516 349/106 |
| 2012/0081649 | A1 * | 4/2012 | Li | G02F 1/136213 349/140 |
| 2014/0009731 | A1 * | 1/2014 | O'Callaghan | G02F 1/136277 349/114 |
| 2014/0160411 | A1 * | 6/2014 | Yim | H01L 27/3244 349/113 |
| 2015/0002953 | A1 * | 1/2015 | Yoon | G02F 1/133555 359/850 |
| 2017/0052409 | A1 * | 2/2017 | Lee | H01L 51/524 |
| 2017/0205543 | A1 * | 7/2017 | Yim | B32B 9/045 |
| 2018/0113336 | A1 * | 4/2018 | Zhang | G02F 1/1337 |

* cited by examiner

*Primary Examiner* — Ryan Crockett
(74) *Attorney, Agent, or Firm* — Christensen O'Connor Johnson Kindness PLLC

(57) ABSTRACT

A reflective semiconductor device includes integrated circuitry disposed in a semiconductor layer. A first plurality of mirrors is formed in a mirror layer over the semiconductor layer, and each of the first plurality of mirrors is spaced apart from one another by at least a uniform width. A thin dielectric film layer covers sidewalls of the first plurality of mirrors and the semiconductor layer in the regions between the spaced apart first plurality of mirrors. A second plurality of mirrors are formed in the mirror layer between the thin dielectric film layer covered sidewalls of the first plurality of mirrors and over the thin dielectric film layer covering the semiconductor layer. Each one of the first and second plurality of mirrors has the uniform width, and is coupled to the integrated circuitry disposed in the semiconductor layer.

36 Claims, 5 Drawing Sheets

LIQUID CRYSTAL ON SILICON DEVICE MIRROR METAL PROCESS

BACKGROUND INFORMATION

Field of the Disclosure

This disclosure relates generally to reflective semiconductor devices, and in particular but not exclusively, relates to liquid crystal on silicon (LCOS) devices.

Background

There are a variety of technologies that are used to display or project video images. Such technologies include for instance cathode ray tubes (CRTs), light emitting diode (LED) displays, organic light emitting diode (OLED) displays, liquid crystal displays (LCDs), digital light processing (DLP), liquid crystal on silicon (LCOS) devices, to name a few. LCOS devices can be found in displays, projectors, microdisplays, as well as other applications such as light switching, wavelength selectable switching, pulse shaping, and the like. LCOS devices generally include liquid crystal layers and other associated layers, which are formed on top of a reflective backplane that is controlled by integrated circuitry. The associated layers that are included with the liquid crystal layer on top of the reflective backplane typically include a protective transparent cover layer, alignment layers, transparent electrode layers, planar insulating layers, and the like. The reflective backplane includes a reflective surface that is controlled by the integrated circuitry to reflect light through the liquid crystal and other layers formed on top of the backplane to modulate light, which can be used to provide images or video to a viewer. One of the ongoing challenges with LCOS devices is the continuing need for higher resolutions and higher dynamic range displays in smaller and more compact chip sizes.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
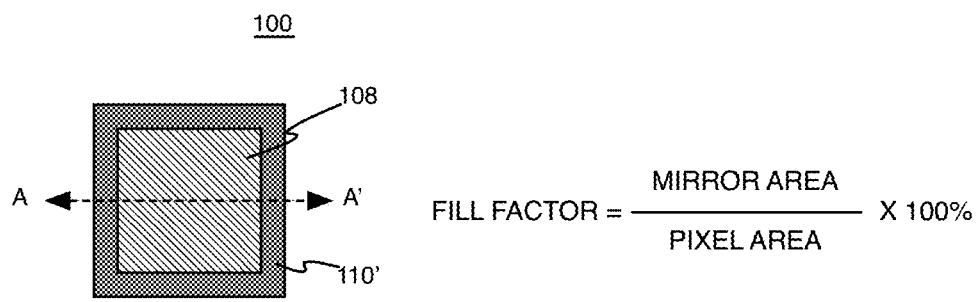
FIGS. 1A-1B illustrate an example of a top down view and a cross section view of an LCOS device in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples directed to a liquid crystal on silicon (LCOS) device, and methods for fabricating the same are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Figure 1B:
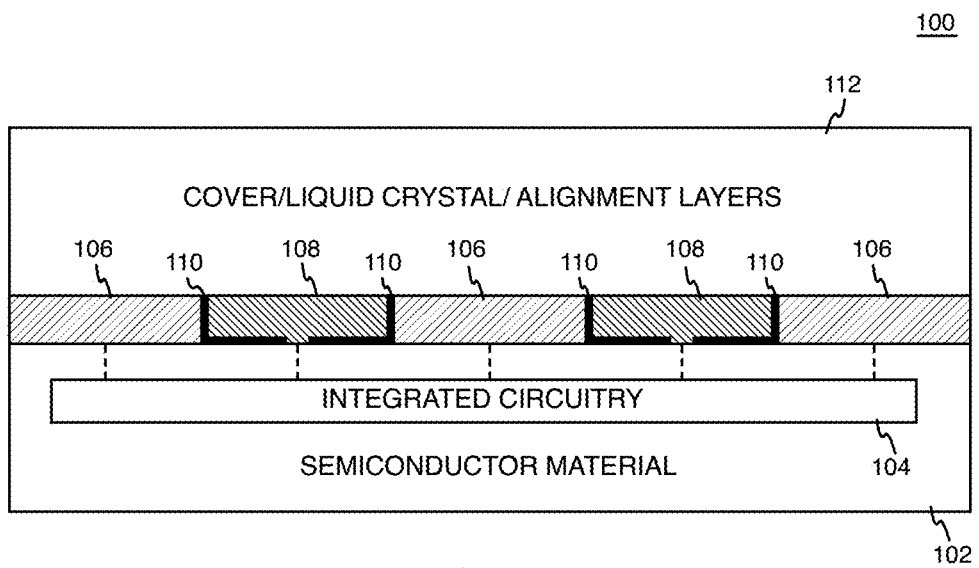

There is continuing need for higher resolution and higher dynamic range LCOS devices with smaller and more compact chip sizes. In order to reflect more light while achieving higher resolution, the fill factor of pixel mirrors in the reflective backplane of the LCOS devices must be increased. To illustrate, FIGS. 1A-1B show an example of a top down view and a cross section view of a portion of reflective semiconductor device such as an LCOS device 100 in accordance with the teachings of the present invention. FIG. 1A illustrates an example top down view of one pixel mirror 108 surrounded by gap material 110' of an LCOS device 100. In one example, it is appreciated that the pixel mirror 108 and the surrounding gap material 110' are representative of one of a plurality of pixels, which may be arranged for instance in a two dimensional pixel array of mirrors of a reflective backplane of LCOS device 100 in accordance with the teachings of the present invention. As shown, the fill factor associated with a pixel is generally equal to the mirror area of the pixel (e.g., the area of pixel mirror 108) divided by the pixel area (e.g., the combination of the area of pixel mirror 108 and the area of gap material 110') multiplied by 100%. For the same pixel pitch, a higher fill factor (i.e., a higher relative mirror area for the same pixel area) can reflect more light, which enables higher dynamic range, higher pixel density, and higher resolution.

However, as device sizes continue to shrink, the back end of line (BEOL) portion of the integrated circuitry fabrication of the LCOS devices is limited by the critical dimension (CD) of the trenches that can be etched between pixel mirrors. In other words, the minimum possible width of the trenches that are etched between pixel mirrors using lithographic techniques limits the size of the minimum pixel gap between pixel mirrors, which limits the fill factor for a pixel.

Furthermore, as the already narrow widths of trenches that are etched between pixel mirrors decrease, there is an increasing challenge to eliminate unwanted air gaps, voids, or other defects in the trenches when attempting to fill the etched trenches between pixel mirrors with insulating gap material. This issue is only exacerbated as the trench widths become narrower. Consequently, it is becoming increasingly difficult to increase the fill factor to achieve higher resolutions and higher dynamic range LCOS devices.

As disclosed below, an example high resolution LCOS device with a high fill factor is realized by providing gaps between pixel mirrors using a thin dielectric film layer that is deposited over sidewalls of a pixel mirror in accordance with the teachings of the present invention. Narrow trenches no longer need to be etched and then filled with insulating gap material. As such, the gap between pixel mirrors is no longer determined by minimum critical dimension (CD) of the lithographic etching of the trenches. Instead, the gap is determined by the thickness of the thin dielectric film layer that is deposited over the sidewalls of the mirrors. In addition, the thin dielectric film layer that is deposited over the sidewalls of the mirrors does not suffer from the air gaps and/or voids that are found in the etched trenches that are filled insulating material between pixel mirrors.

FIG. 1B illustrates an example cross section view along dashed line A-A' of FIG. 1A of an LCOS device 100 in accordance with the teachings of the present invention. As shown in FIG. 1B, the LCOS device 100 includes an integrated circuitry 104 disposed in a semiconductor material layer 102. In one example, the semiconductor material layer 102 includes silicon (Si), and the integrated circuitry 104 is fabricated in semiconductor material layer 102. The integrated circuitry 104 is coupled to control a first plurality of mirrors 106 and a second plurality of mirrors 108 that are included in a mirror layer that is disposed over the semiconductor material layer 102 and the integrated circuitry 104 to form a reflective backplane of the LCOS device 100.

As will be discussed in greater detail below, each one of the first plurality of mirrors 106 is spaced apart from another one of the first plurality of mirrors 106 by at least a uniform width. In the depicted example, a thin dielectric film layer 110 is deposited over the sidewalls of the first plurality of mirrors 106 and over the semiconductor material layer 102 in the regions between the first plurality of mirrors 106 prior to forming the second plurality of mirrors 108. Each one of the second plurality of mirrors 108 is then formed between the thin dielectric film layer 110 covered sidewalls of the first plurality of mirrors 106 and over the thin dielectric film layer 110 portions covering the semiconductor material layer 102 in each region between the sidewalls of each one of the first plurality of mirrors 106. As such, each one of the second plurality of mirrors 108 has the same uniform width as each one of the plurality of first mirrors 106. The thickness of the thin dielectric film layer 110 is selected to maximize the fill factor (i.e., minimize the space between the first plurality of mirrors 106 and the second plurality of mirrors 108) while sufficient to isolate the first plurality of mirrors 106 and the second plurality of mirrors 108. In one example, the thickness of the thin dielectric film layer 110 may range from 5 nm to 150 nm. In one example, the thin dielectric film layer 110 may be formed from a dielectric material such as oxide (e.g., silicon dioxide ($SiO_2$)), nitride, oxynitride, or other suitable insulating or isolating material. In another example, the thin dielectric film layer may include a high-k material, i.e., material with dielectric constant k higher than 3.9, for example, hafnium dioxide ($HfO_2$), zirconium dioxide ($ZrO_2$) and titanium dioxide ($TiO_2$). The narrow thickness of the thin dielectric film layer 110 provides a very thin and high quality pixel gap between the first plurality of mirrors 106 and the second plurality of mirrors 108, which enables LCOS device 100 to realize a higher fill factor and therefore higher reflectivity and higher dynamic range in accordance with the teachings of the present invention.

In one example, the integrated circuitry 104 is coupled to the first plurality of mirrors 106 and the second plurality of mirrors 108 through contacts and/or vias, which are represented in FIG. 1B with dashed lines, to control the light reflecting operation of the pixel mirrors. For example, a metal or conductive layer with metal contact or vias may be formed in between the mirror layer and the integrated circuitry 104 to electrically couple each of the first plurality of mirrors 106 and the second plurality of mirrors 108 to each associated pixel circuit in the integrated circuitry 104.

In various examples, it is appreciated that the integrated circuitry 104 may also provide integrated driver functions, e.g., control operation of liquid crystal, memory, and other functions for the LCOS device 100. In one example, each one of the second plurality of mirrors 108 is coupled to the integrated circuitry 104 disposed in the semiconductor material layer 102 though a respective opening in the thin dielectric film layer 110.

It is appreciated that skilled artisans will understand that the integrated circuitry 104 include driving circuitries, image buffer circuitries, control circuitries, and other logic circuitry as needed to realize a controller to the LCOS device 100 in accordance with the teachings of the present invention. In one example, the integrated circuitry 104 may include a plurality of driving circuitries, an image buffer, and a control circuitry. The integrated circuitry 104 may be connected to an external video processor or computing device to receive an image data. The control circuitry may be configured to generate one or more light control signals based on the image data received and output the light control signals to the image buffer for temporarily storage. The image buffer may be configured to output the one or more light control signals to drive the driving circuit. The plurality of driving circuitries, such as SRAM circuitries, may be coupled to the first plurality of mirrors 106 and the second plurality of mirrors 108. The plurality of driving circuitries may be further configured to control the light reflecting operation of each individual first plurality of mirrors 106 and second plurality of mirrors 108 so as to control the light guiding operation for each pixel based on the one or more light control signals received. It is appreciated that details of the integrated circuitry 104 are not shown or described in detail to avoid obscuring the teachings of the present invention.

The example depicted in FIG. 1B also illustrates that the LCOS device 100 includes additional upper layers 112, which may include for example a transparent protective cover layer, a liquid crystal layer, alignment layers for liquid crystal alignment, transparent electrode layers, anti-reflective coatings, a glass substrate, polarization layers, or the like as needed to realize an LCOS device.

In one example, the transparent protective cover layer, such as an oxide layer, a nitride layer, or the combination thereof may be added to passivate the first and second plurality of mirrors 106, 108 for preventing moisture and other atmospheric contaminants from degrading the first and second plurality of mirrors 106, 108.

In one example, the alignment layers may include a top alignment layer and a bottom alignment layer. The top alignment layer is positioned between the transparent electrode layers and the liquid crystal layer. The bottom alignment layer is positioned between the liquid crystal layer and the transparent protective cover layer. The top and bottom alignment layers may be configured to control the arrangement direction of the liquid crystals in the liquid crystal layer for facilitating the alignment of liquid crystals. The top and bottom alignment layers may for example be made of polyimide, which when rubbed in a certain direction prior to assembly of LCOS device, causes the liquid crystals in the liquid crystal layer to align in a predetermined directions manner.

In one example, the transparent electrode layer formed above the top alignment layer may be formed of transparent conductive materials, such as indium tin oxide (ITO). The transparent electrode layer may be configured for providing a common voltage. The common voltage and the driving voltages provided by the first and second plurality of mirrors 106, 108 generates different potential differences in different pixel regions, which drive the liquid crystals in the liquid crystal layer to rotate, thereby control the amount of penetrating light beams reflected and emitted out by the LCOS device 100.

In one example, the glass substrate may be formed transparent electrode layer and may have an anti-reflective coating positioned on the surface of the glass substrate for light to exist. The glass substrate may be referred as the front plane of the LCOS device.

In one example, polarization layers, such as polarizer and analyzer pair or polarizing beam splitter (PBS) layers may be included in the additional upper layers 112 for polarizing light, or separating orthogonal polarization orientations of light for the image display and projection operation.

The additional upper layers 112 are disposed over the mirror layer including the first plurality of mirrors 106 and the second plurality of mirrors 108 as shown. It is appreciated that each individual layer of additional upper layers 112 is not shown or described in detail to avoid obscuring the teachings of the present invention. It should be also appreciated by one skilled in the art that additional upper layers 112 can be configured and implemented in various ways for each particular image projection application, but such implementation or design decisions should not be interpreted as causing a departure from the scope of the disclosed LCOS structure.

In an exemplary operation, light passes through the additional upper layers 112 and is then polarized and reflected off of the first plurality of mirrors 106 and the second plurality of mirrors 108 of the mirrors layer of LCOS device 100. Each one of the first plurality of mirrors 106 and second plurality of mirrors 108 is separately controlled by the integrated circuitry 104 as a pixel. In general, the integrated circuitry 104 controls each of the mirrors (e.g., mirrors 106, 108) in the mirror layer to control the alignment and origination of liquid crystals in the liquid crystal layer to act as light gates or valves, so as to modulate the optical transmission path of the polarized light that reaches the reflective surface provided by the first plurality of mirrors 106 and the second plurality of mirrors 108. For instance, in one example, the higher the amount of signal a particular mirror in the mirror layer receives from the integrated circuitry 104 (e.g., the relative magnitude of the voltage asserted by the integrated circuitry 104 on each pixel mirror), the greater the modulation of the polarized light. As such, the incident light that is directed through and modulated by the liquid crystal layer, reflected from the first and second plurality of mirrors 106 and 108, and emitted back out from additional upper layers 112. The reflected light emitted from the LCOS device 100 forms the image produced by the LCOS device 100 that may be further projected onto a display by a projection lens in accordance with the teachings of the present invention.

It is appreciated by those skilled in the art that the LCOS device 100 may be optically coupled with projection lens and incorporated into an image projection system, such as displays, projectors, or microdisplays for various image projection applications.

Figure 2A:
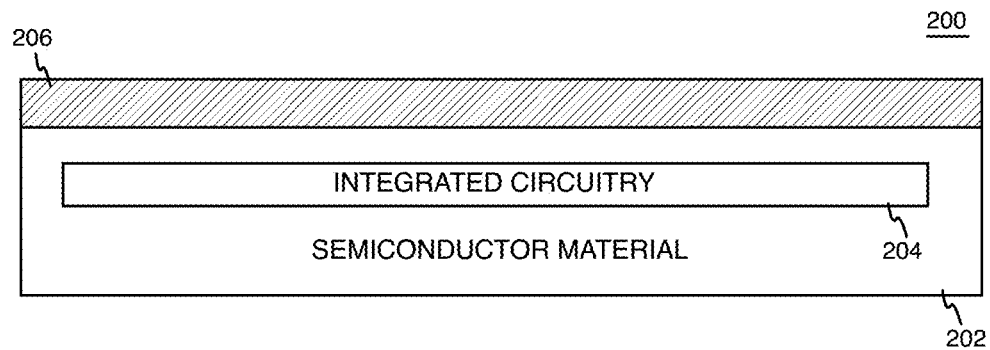
FIGS. 2A-2G illustrate various example cross section processing views during fabrication of one example of an LCOS device in accordance with the teachings of the present invention.

FIGS. 2A-2G illustrate various example cross section processing views during fabrication of one example of an LCOS device 200 in accordance with the teachings of the present invention. It is appreciated that the LCOS device 200 of FIGS. 2A-2B may be another example of LCOS device 100 of FIGS. 1A-1B, and that similarly named and numbered elements described above are coupled and function similarly below. As shown in FIG. 2A, the LCOS device 200 includes an integrated circuitry 204 that is fabricated in a semiconductor material layer 202. In one example, the integrated circuitry 204 and semiconductor material layer 202 may include complementary metal oxide semiconductor (CMOS) integrated circuitry fabricated on a silicon (Si) wafer or the like. A first metal layer 206 is then formed over the integrated circuitry 204 and the semiconductor material layer 202 as shown. In one example, the first metal layer 206 includes a reflective metal, such as for example but not limited to aluminum (Al). In other examples, it is appreciated that other suitable reflective conductive metals may be utilized to form the first metal layer 206 in accordance with teachings of the present invention.

Figure 2B:
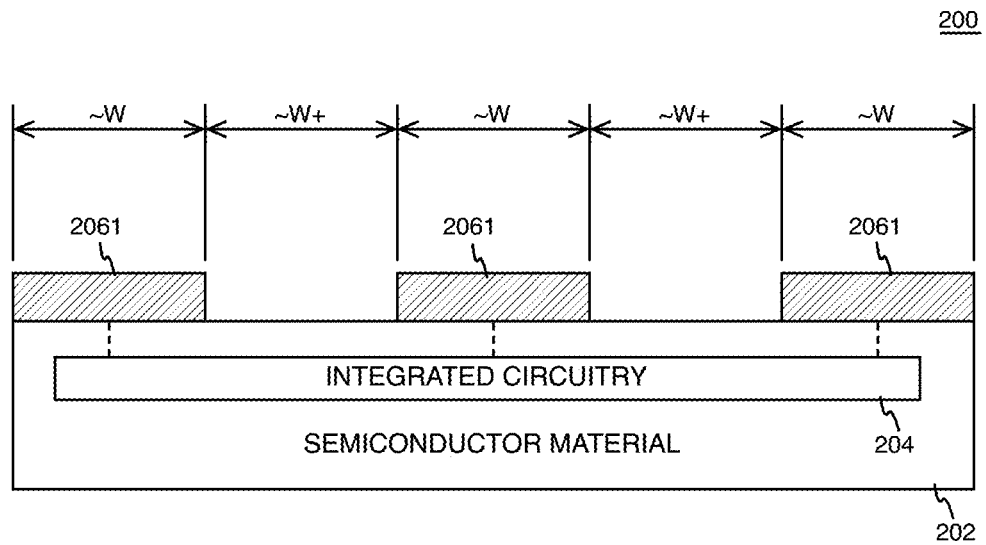

FIG. 2B shows that the first metal layer 206 is then etched to form the first plurality of mirrors 2061. In one example, a side of each one of the first plurality of mirrors 2061 has a lateral width substantially equal to W, and each one of the first plurality of mirrors 2061 is spaced apart from another one of the first plurality of mirrors 2061 by at least the substantially uniform lateral width W. In the example, it is appreciated that the lateral width W is substantially greater than the minimum critical dimension (CD) of the lithographic fabrication process. As a result, etching the first plurality of mirrors 2061 from the first metal layer 206 is a significantly less challenging task compared to attempting to etch narrow trenches having a width equal to the minimum critical dimension (CD) limit of a lithographic fabrication process. In one example, the width W may be configured to be greater or equal to 1um.

In the depicted example, it appreciated that the substantially uniform width that each of the first plurality of mirrors 2061 is spaced apart from one another is illustrated in FIG. 2B as "~W+" to indicate that the first plurality of mirrors 2061 are spaced apart by at least the substantially uniform lateral width W. For instance, in one example, the first plurality of mirrors 2061 are spaced apart after trenching by an amount slightly greater than the substantially uniform width W to accommodate for the narrow thickness of a thin dielectric film layer, which is subsequently deposited over sidewalls of the first plurality of mirrors 2061, and over the exposed regions of the semiconductor material layer 202 between the sidewalls of the first plurality of mirrors 2061. The dashed lines shown in FIG. 2B represent that each of the plurality of mirrors 2061 is coupled to the integrated circuitry 204 fabricated in the semiconductor material layer 202.

Figure 2C:
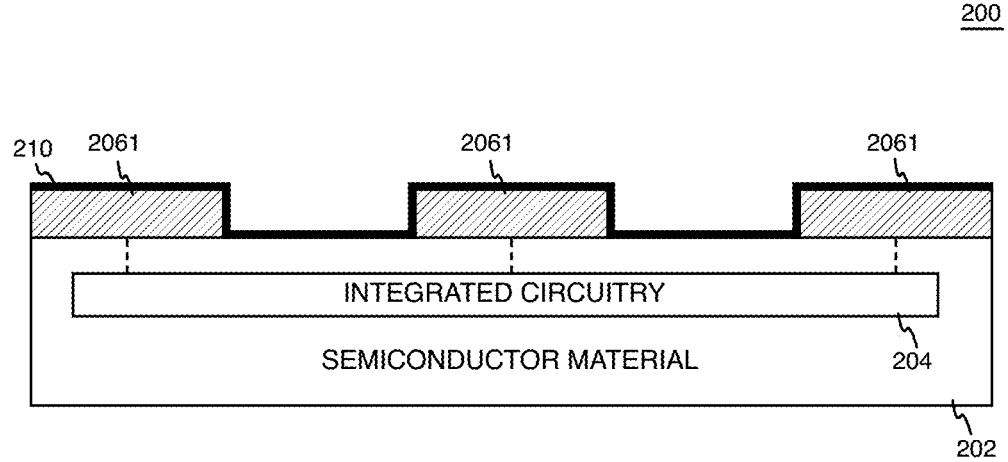

FIG. 2C shows a thin dielectric film layer 210 that has been deposited and covering sidewalls of the first plurality of mirrors 2061 and the semiconductor material layer 202 in each region between each one of the spaced apart first plurality of mirrors 2061. In so doing, the thin dielectric film layer 210 covers the surface of the first plurality of mirrors 2061, sidewalls of the first plurality of mirrors 2061, and the semiconductor material layer 202 in the openings etched through the first metal layer 206 as shown.

It is reminded that a skilled artisans will appreciate that the thickness of the thin dielectric film layer 210 illustrated in FIG. 2C is shown for explanation purposes, and that the figures are illustrated for simplicity and clarity and have not necessarily been drawn to scale. The dimensions and thicknesses of some of the elements in the figures such as the thin dielectric film layer 210 may be exaggerated relative to other elements to help to improve understanding of various examples in accordance with the teachings of the present invention.

In one example, the thin dielectric film layer 210 is deposited over the surface and sidewalls of the first plurality of mirrors 2061 and the semiconductor material layer 202 in the regions between the sidewalls of the first plurality of mirrors 2061 using techniques such as chemical vapor deposition (CVD), atomic layer deposition (ALD), physical vapor deposition (PVD), or other suitable techniques to deposit a thin dielectric film material. In one example, the thickness of the thin dielectric film layer 210 may range from 5 nm to 150 nm. The thin dielectric film layer 210 may be formed by applying surface treatment such as oxidation, nitration or the combination thereof. In one example, the thin dielectric film layer 210 includes a dielectric material such as an oxide (e.g., silicon dioxide ($SiO_2$), native oxide), nitride (e.g., aluminum nitride (AlN)), oxynitride, or other suitable insulating or isolating material. In another example, the thin dielectric film layer may include a high-k material, i.e., dielectric material with dielectric constant k higher than 3.9, such as hafnium dioxide ($HfO_2$), zirconium dioxide ($ZrO_2$) and titanium dioxide ($TiO_2$). In one example where the thin dielectric film layer is formed with a native oxide, the thickness of the thin dielectric film layer may range from 2 nm-50 nm. It is appreciated that by depositing the thin dielectric film layer 210 using the CVD, PVD, ALD, or surface treatment techniques as described, the thin dielectric film layer 210 can be formed substantially free of air gaps, voids, or other defects that otherwise occur when attempting to fill narrow trenches in etched metals at the minimum critical dimension (CD) of the lithographic fabrication process as discussed above.

Figure 2D:
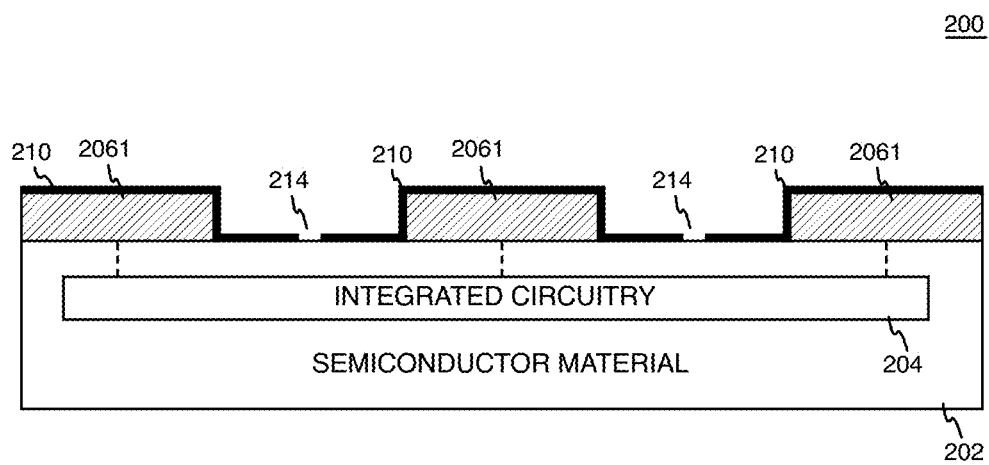

Continuing with the example, FIG. 2D illustrates openings 214 that are created through the thin dielectric film layer 210 to the integrated circuitry 204 and the semiconductor material layer 202 in regions between the thin dielectric film layer 210 covered sidewalls of the first plurality of mirrors 2061 to provide contact access to the integrated circuitry 204 fabricated in the semiconductor material layer 202. In one example, the openings 214 through thin dielectric film layer 210 may be created by etching or other suitable techniques.

Figure 2E:
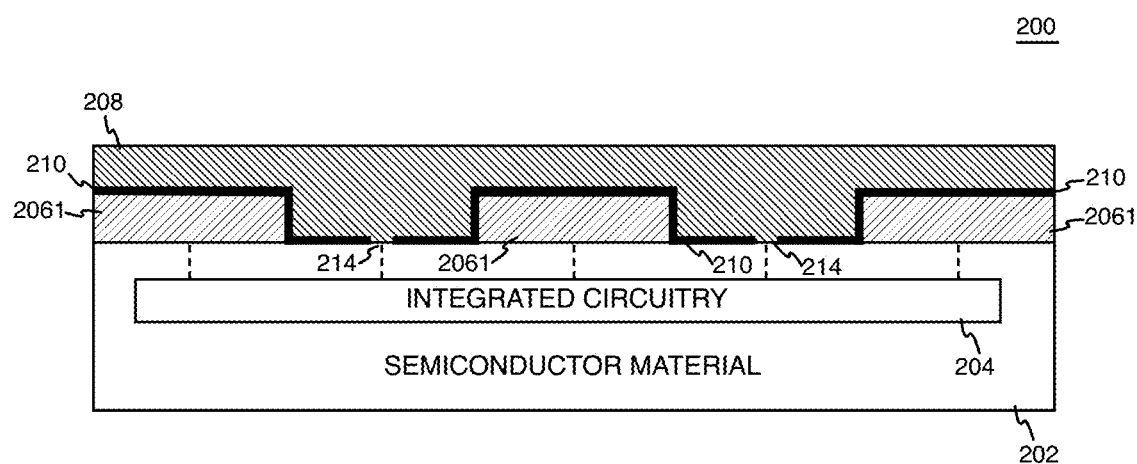

FIG. 2E illustrates that a second metal layer 208 is then formed over the thin dielectric film layer 210 and the openings 214 through the thin dielectric film layer 210 to the integrated circuitry 204 and the semiconductor material layer 202. In one example, the second metal layer 208 includes a reflective metal, such as for example but not limited to aluminum (Al). In other examples, it is appreciated that other suitable reflective conductive metals may be utilized to form the second metal layer 208 in accordance with teachings of the present invention. In one example, the same type of reflective conductive metal is utilized to form the first metal layer 206 and the second metal layer 208. However, it is appreciated the first metal layer 206 and the second metal layer 208 are formed and deposited separately from one another over the integrated circuitry 204 and the semiconductor material layer 202 in accordance with the teachings of the present invention. Stated in another way, the second metal layer 208 is not formed until after the thin dielectric film layer 210 is deposited over the first metal layer 206 as shown in FIGS. 2C-2D.

Figure 2F:
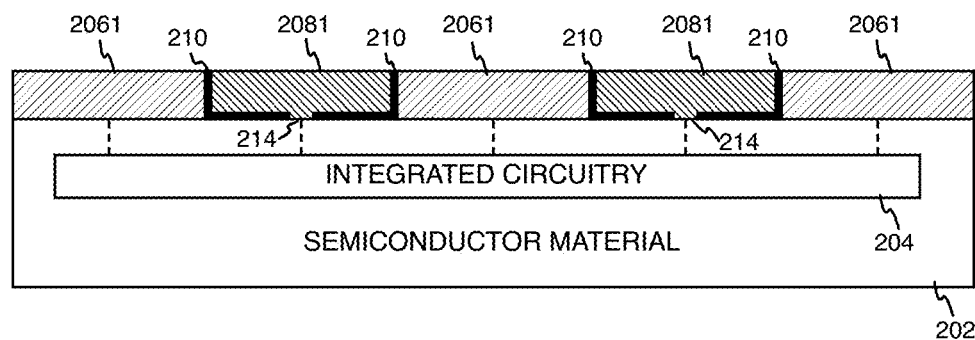

Continuing with the example, FIG. 2F illustrates that second metal layer is then thinned down to the sidewalls of the first plurality of mirrors 2061 to form a second plurality of mirrors 2081 between the thin dielectric film layer 210 covered sidewalls of the first plurality of mirrors 2061. As such, each one of the second plurality of mirrors 2081 is formed between the thin dielectric film layer 210 covered sidewalls of the first plurality of mirrors 2061 and over the thin dielectric film layer 210 covering the semiconductor material layer 202 in each region between each one of the first plurality of mirrors 2061. In the example, each one of the first plurality of mirrors 2061 and each one of the second plurality of mirrors 2081 has substantially the same uniform width W, as illustrated above in for example FIG. 2B. In the example, each one of the second plurality of mirrors 2081 is coupled to the integrated circuitry 204 disposed in the semiconductor material layer 202 though a respective opening in the thin dielectric film layer 210, as represented in FIG. 2E-2F with the dashed lines.

In one example, it is appreciated that the second metal layer 208 may be thinned using techniques such as chemical mechanical polishing (CMP) or the like. In one example, the resulting mirror layer that is formed with the first plurality of mirrors 2061 and the second plurality of mirrors 2081 is also planarized and polished using same CMP processing to thin the second metal layer. In one example, a CMP process with an end-point detection may be utilized, e.g., stop the planarization and polishing process after a predetermined time (e.g., $5s$-$100s$) upon detecting an end-point. In one example, the end-point may be defined as a surface resistance value (e.g., the surface resistance value of at least one of the first plurality of mirrors 2061 and the second plurality of mirrors 2081) being greater than a predefined resistance threshold. In another example, the end-point may be defined as a surface friction value (e.g., the surface friction value of at least one of the first plurality of mirrors 2061 and the second plurality of mirrors 2081) being greater than a predefined friction threshold, for slightly over-polishing the second metal layers. In yet another example, the end-point may be defined as a reflection detected from at least one of the first plurality of mirrors 2061 and the second plurality of mirrors 2081. As such, the end-point detection may be utilized so as to ensure that the thickness variation among the first plurality of mirrors 2061 and the second plurality of mirrors 2081 is minimized. In other words, the end-point detection may be used to ensure the first plurality of mirrors 2061 and the second plurality of mirrors 2081 have the desired thickness and flatness for high reflectively. The polishing rate for planarizing and polishing the first and second metal layers before detecting the end-point may be greater than the polishing rate during the predetermined time after detecting the end-point.

It is appreciated that those skilled in the art may know in light of and in accordance with the teachings of the present invention, how to select the appropriate polishing rate for the time period before detecting the end-point and the time period during the predetermined time after detecting the end-point. It is further appreciated that any skilled artisan may know how to set the end-point (e.g., the predefined resistance threshold and the predefined friction threshold) to achieve desired polishing or planarizing result for the first plurality of mirrors 2061 and the second plurality of mirrors 2081.

Figure 2G:
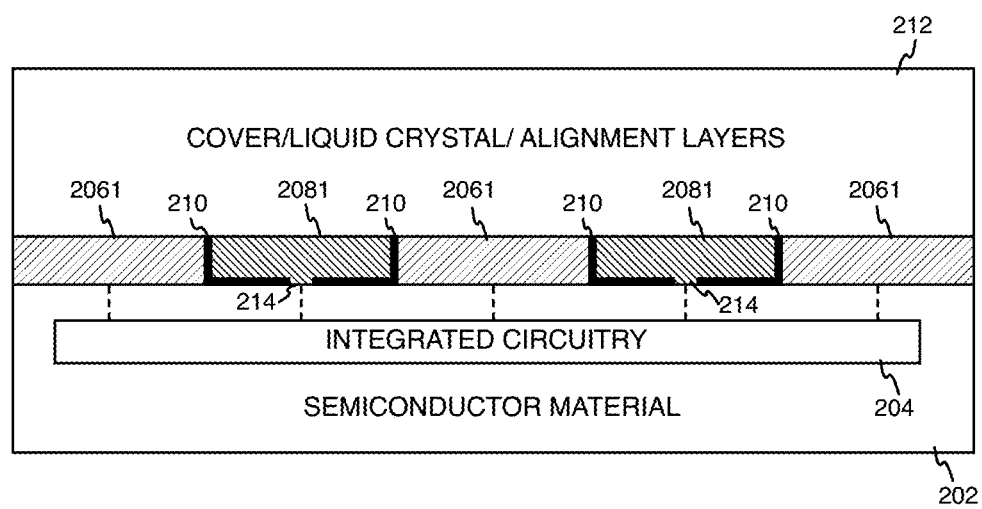

FIG. 2G illustrates an example in which additional upper layers 212 are then formed over the planarized mirror layer including the first plurality of mirrors 2061 and the second plurality of mirrors 2081 in the LCOS device 200. It is appreciated that each of the individual layers included in additional upper layers 212 are not shown or described in detail to avoid obscuring the teachings of the present invention. It is appreciated that skilled artisans will understand that additional upper layers 212 as described in previous examples may include for example a transparent protective cover layer, liquid crystal layer, alignment layers, transparent electrode layers, polarization layers, anti-reflective coatings, or the like as needed to realize an LCOS device in accordance with the teachings of the present invention.

Figure 3:
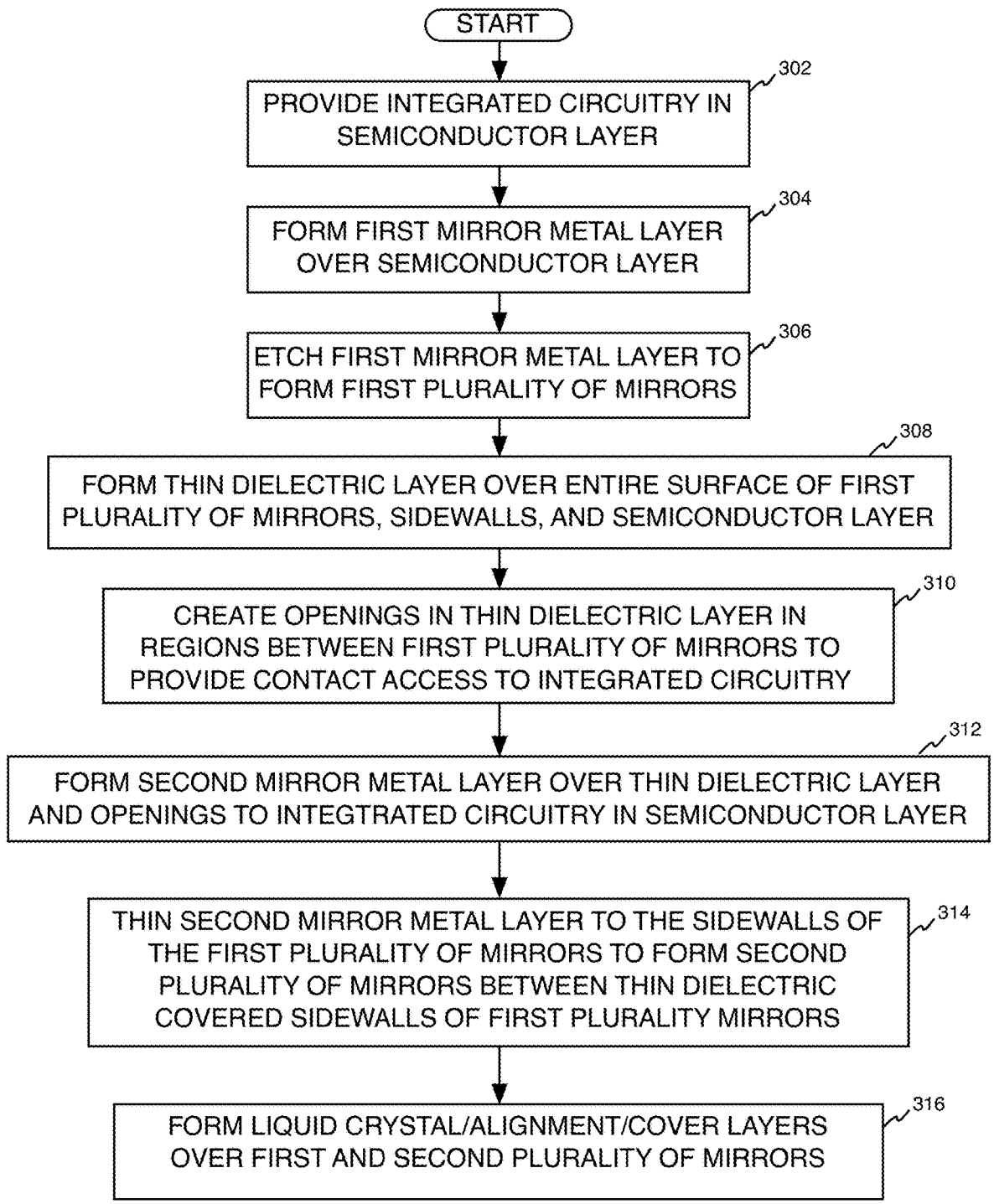
FIG. 3 is a flow diagram illustrating processing steps to fabricate one example of an LCOS device in accordance with the teachings of the present invention.

FIG. 3 is a flow diagram 300 illustrating processing steps to fabricate one example of an LCOS device in accordance with the teachings of the present invention. It is appreciated that the LCOS device fabricated utilizing the processing steps illustrated in FIG. 3 may be an example of LCOS device 100 of FIGS. 1A-1B or LCOS device 200 of FIGS. 2A-2G, and that similarly named and numbered elements described above are coupled and function similarly below.

As shown in process block 302, an integrated circuitry is provided in a semiconductor layer. In one example, the integrated circuitry and semiconductor layer may include CMOS integrated circuitry fabricated in a silicon (Si) semiconductor wafer. Process block 304 shows that a first mirror metal layer is then formed over the semiconductor layer that includes the integrated circuitry fabricated therein. In one example, the first mirror metal layer may include a reflective conductive metal such as for example but not limited to aluminum (Al) or the like. In other examples, the first mirror metal layer may include a different suitable reflective conductive metal.

Process block 306 shows that the first mirror metal layer is then etched to form a first plurality of mirrors. In one example, each side of each of the first plurality of mirrors has a substantially uniform lateral width. In one example, each one of the first plurality of mirrors is spaced apart from another one of the first plurality of mirrors in the mirror layer by at least or slightly greater than the substantially uniform lateral width. In one example, the substantially uniform lateral width is substantially greater than a minimum critical dimension (CD) of a lithographic fabrication process to etch a narrow trench in a metal layer. In one example, the uniform lateral width between each of the first plurality of mirrors may be greater or equal to 1 um.

Process block 308 shows that a thin dielectric film layer is then formed over the surface of the first plurality of mirrors, including the sidewalls of the first plurality of mirrors, as well over the semiconductor material layer with integrated circuitry exposed after the etching the first mirror metal layer. In one example, the thickness of the thin dielectric film layer 110 may range from 5 nm to 150 nm depending upon the fill factor requirement and process considerations. In various examples, it is appreciated that the thin dielectric film layer includes an oxide material, such as for example silicon dioxide ($SiO_2$), a nitride material, such as aluminum nitride (AlN), or a high-k material, such as hafnium dioxide ($HfO_2$), zirconium dioxide ($ZrO_2$), or titanium dioxide ($TiO_2$). In one example, the thin dielectric film layer may include a native oxide or a surface oxide formed from oxidation of the first mirror metal layer. The thickness of the thin dielectric film layer formed from native oxide may range from 2 nm-50 nm.

The thin dielectric film layer is deposited using techniques such as chemical vapor deposition (CVD), atomic layer deposition (ALD), physical vapor deposition (PVD) or the like. In one example, the thin dielectric film layer is an insulating material.

In one example, the thin dielectric film layer may be formed by applying surface treatment the first mirror metal layer. In other words, the thin dielectric film layer may be formed by an oxidation or nitration process of the first mirror metal layer. It is appreciated that skilled artisan will understand the technique for performing oxidation and/or nitration, such as, configuration proper temperature, adding agents for oxidation/nitration, and other environmental settings, to obtain the thin dielectric film layer of desire thickness.

Process block 310 show that openings are then are then created through the thin dielectric film layer to the semiconductor layer in regions between thin dielectric film layer covered sidewalls of the first plurality of mirrors to provide contact access to the integrated circuitry in the semiconductor layer.

Process block 312 shows that a second mirror metal layer is then formed over the thin dielectric film layer and the openings through the thin dielectric film layer to the semiconductor layer. In one example, the second mirror metal layer may include a reflective conductive metal such as for example but not limited to aluminum (Al) or the like. In various examples, the first mirror metal layer and the second mirror metal layer may include the same or different but suitable reflective conductive metals.

Process block 314 shows that the second mirror metal layer is then thinned down to the sidewalls of the first plurality of mirrors to form a second plurality of mirrors between the thin dielectric film layer covered sidewalls of the first plurality of mirrors. In various examples, each of the first plurality of mirrors and the second plurality of mirrors have the same substantially uniform lateral width, and are separated by the narrow thickness of the thin dielectric film layer previously deposited over the sidewalls of the first plurality of mirrors. In other words, the thin dielectric film layer defines the space or gap between each of the first plurality of mirrors and each of the second plurality of mirrors. The thin dielectric film layer further isolates each of the first plurality of mirrors from each of the second plurality of mirrors. In one example, the CMP process may include setting an end-point and stopping the CMP process upon detecting an end-point. The process of setting an end-point may further include configuring end-point detection parameters, such as a predefined resistance threshold or a predefined friction threshold, and a predetermined time for over polish. The end-point detection CMP process may include stopping the chemical mechanical polishing planarization process after a predetermined time (e.g., 5-100 s) upon detecting the end-point to over-polish the surface first and the second mirror metal layers, ensure that the thickness variation among the first plurality of mirrors and the second plurality of mirrors can be minimized and to have substantially uniform reflectivity from the plurality of mirrors and the second plurality of mirrors.

The end-point in one example may be defined as a surface resistance value detected from a surface of at least one of the first plurality of mirrors and the second plurality of mirrors is greater or equal to the predefined resistance threshold. The end-point in another example may be defined as a surface friction value detected from a surface of at least one of the first plurality of mirrors and the second plurality of mirrors is greater or equal to the predefined friction threshold. In another example, the end-point may be defined as both a surface resistance value detected from a surface of at least one of the first plurality of mirrors and the second plurality of mirrors being greater than or equal to the predefined resistance threshold and a surface friction value detected from a surface of at least one of the first plurality of mirrors and the second plurality of mirrors being greater than or equal the predefined friction threshold. In further example, the end-point may be defined as a reflection detected from a surface of at least one of the first plurality of mirrors and the second plurality of mirrors.

In one example, the polishing rate for planarizing and polishing the first and second metal layers before detecting the end-point may be greater than the polishing rate during the predetermined time after detecting the end-point.

Process block 316 shows that additional upper layers are then formed over the planarized mirror layer including the first plurality of mirrors and the second plurality of mirrors to form an LCOS device. In various examples, the additional upper layers may include for example a transparent protective cover layer, liquid crystal layer, alignment layers (e.g., a top alignment layer and a bottom alignment layer), transparent electrode layers, a glass substrate with anti-reflective coatings, polarization layers (e.g., polarizer and analyzer, or polarizing beam splitter layers) or the like as needed to realize an LCOS device or a LCOS system in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A reflective semiconductor device, comprising:
   an integrated circuitry disposed in a semiconductor layer;
   a first plurality of mirrors formed in a mirror layer disposed over the semiconductor layer, wherein each one of the first plurality of mirrors is coupled to the integrated circuitry disposed in the semiconductor layer, and wherein each one of the first plurality of mirrors is spaced apart from another one of the first plurality of mirrors in the mirror layer by at least a uniform width;
   a thin dielectric film layer covering sidewalls of the first plurality of mirrors and the semiconductor layer in each region between each one of the spaced apart first plurality of mirrors; and
   a second plurality of mirrors formed in the mirror layer, wherein each one of the second plurality of mirrors is formed between the thin dielectric film layer covered sidewalls of the first plurality of mirrors and over the thin dielectric film layer covering the semiconductor layer in each region between each one of the first plurality of mirrors, wherein each one of the first plurality of mirrors and each one of the second plurality of mirrors has the uniform width, wherein each one of the second plurality of mirrors is coupled to the integrated circuitry disposed in the semiconductor layer though a respective opening in the thin dielectric film layer.

2. The reflective semiconductor device of claim 1, wherein the thin dielectric film layer covering the sidewalls of the first plurality of mirrors isolates the first plurality of mirrors from the second plurality of mirrors.

3. The reflective semiconductor device of claim 1, wherein the thickness of the thin dielectric film layer ranges from 5 nm to 150 nm.

4. The reflective semiconductor device of claim 1, further comprising a liquid crystal layer disposed over the mirror layer.

5. The reflective semiconductor device of claim 4, wherein the reflective semiconductor device is a liquid crystal on silicon (LCOS) device.

6. The reflective semiconductor device of claim 1, wherein the thin dielectric film layer comprises dielectric material deposited by chemical vapor deposition (CVD) over the sidewalls of the first plurality of mirrors and over the semiconductor layer in each region between each one of the spaced apart first plurality of mirrors.

7. The reflective semiconductor device of claim 1, wherein the thin dielectric film layer comprises dielectric material deposited by atomic layer deposition (ALD) over the sidewalls of the first plurality of mirrors and over the semiconductor layer in each region between each one of the spaced apart first plurality of mirrors.

8. The reflective semiconductor device of claim 1, wherein the thin dielectric film layer comprises dielectric material deposited by physical vapor deposition (PVD) over the sidewalls of the first plurality of mirrors and over the semiconductor layer in each region between each one of the spaced apart first plurality of mirrors.

9. The reflective semiconductor device of claim 1, wherein the thin dielectric film layer is comprised of an oxide.

10. The reflective semiconductor device of claim 1, wherein the thin dielectric film layer is comprised of a nitride.

11. The reflective semiconductor device of claim 1, wherein the thin dielectric film layer is comprised of a dielectric material having a dielectric constant greater than 3.9.

12. The reflective semiconductor device of claim 1, wherein at least a portion of the thin dielectric film layer is disposed between the second plurality of mirrors and the semiconductor layer in each region between each one of the spaced apart first plurality of mirrors.

13. The reflective semiconductor device of claim 1, wherein the width of the first plurality of mirrors is substantially greater than or equal to 1um.

14. The reflective semiconductor device of claim 13, wherein the width of the second plurality of mirrors is substantially greater than or equal to 1um.

15. The reflective semiconductor device of claim 1, wherein the mirror layer is planarized using chemical mechanical polishing (CMP).

16. The reflective semiconductor device of claim 1, wherein the first plurality of mirrors and the second plurality of mirrors comprise metal.

17. The reflective semiconductor device of claim 16, wherein the first plurality of mirrors comprises aluminum.

18. The reflective semiconductor device of claim 16, wherein the second plurality of mirrors comprises aluminum.

19. A method of forming a reflective semiconductor device, comprising:
providing an integrated circuitry in a semiconductor layer;
forming a first metal layer over the semiconductor layer;
etching openings through the first metal layer to the semiconductor layer to form a first plurality of mirrors over the semiconductor layer comprising the first metal layer, wherein each one of the openings through the first metal layer have at least a uniform width;
covering a surface of the first plurality of mirrors, sidewalls of the first plurality of mirrors, and the semiconductor layer in the openings etched through the first metal layer with a thin dielectric film layer;
creating openings through the thin dielectric film layer to the semiconductor layer in regions between thin dielectric film layer covered sidewalls of the first plurality of mirrors to provide contact access to the integrated circuitry in the semiconductor layer;
forming a second metal layer over the thin dielectric film layer and the openings through the thin dielectric film layer to the semiconductor layer; and
thinning the second metal layer to the sidewalls of the first plurality of mirrors to form a second plurality of mirrors between the thin dielectric film layer covered sidewalls of the first plurality of mirrors, wherein the first plurality of mirrors and the second plurality of mirrors have the uniform width.

20. The method of claim 19, further comprising forming a liquid crystal layer over the first plurality of mirrors and the second plurality of mirrors to form a liquid crystal on silicon (LCOS) device.

21. The method of claim 19, further comprising coupling the integrated circuitry in the semiconductor layer to the first plurality of mirrors and the second plurality of mirrors.

22. The method of claim 19, wherein the first metal layer comprises aluminum.

23. The method of claim 22, wherein the second metal layer comprises aluminum.

24. The method of claim 19, wherein at least a portion of the thin dielectric film layer is disposed between the second plurality of mirrors and the semiconductor layer in each region between each one of the first plurality of mirrors.

25. The method of claim 19, wherein said covering the surface of the first plurality of mirrors, the sidewalls of the first plurality of mirrors, and the semiconductor layer in the openings etched through the first metal layer with the thin dielectric film layer comprises depositing the thin dielectric film layer using chemical vapor deposition (CVD).

26. The method of claim 19, wherein said covering the surface of the first plurality of mirrors, the sidewalls of the first plurality of mirrors, and the semiconductor layer in the openings etched through the first metal layer with the thin dielectric film layer comprises depositing the thin dielectric film layer using atomic layer deposition (ALD).

27. The method of claim 19, wherein said covering the surface of the first plurality of mirrors, the sidewalls of the first plurality of mirrors, and the semiconductor layer in the openings etched through the first metal layer with the thin dielectric film layer comprises applying surface treatment to the first plurality of mirrors to form the thin dielectric film layer.

28. The method of claim 19, wherein the thin dielectric film layer comprises an oxide.

29. The method of claim 28, wherein the thin dielectric film layer comprises silicon dioxide ($SiO_2$).

30. The method of claim 19, wherein the thin dielectric film layer comprises dielectric material with a dielectric constant greater than 3.9.

31. The method of claim 19, wherein said thinning the second metal layer to the sidewalls of the first plurality of mirrors comprises chemical mechanical polishing (CMP) the second metal layer to the sidewalls of the first plurality of mirrors.

32. The method of claim 31, wherein said chemical mechanical polishing (CMP) the second metal layer to the sidewalls of the first plurality of mirrors comprises planarizing the first plurality of mirrors and the second plurality of mirrors.

33. The method of claim 31, wherein said chemical mechanical polishing (CMP) the second metal layer to the sidewalls of the first plurality of mirrors comprises:
setting an end-point for the CMP; and
continually planarizing the first plurality of mirrors and the second plurality of mirrors for a predetermined period after detecting the end-point for the CMP.

34. The method of claim 33, wherein the end-point for the CM' is defined as at least a surface resistance value detected from a surface of at least one of the first plurality of mirrors and second plurality of mirrors being greater than or equal to a predefined resistance threshold.

35. The method of claim 33, wherein the end-point for the CM' is defined as at least a surface friction value detected from a surface of at least one of the first plurality of mirrors and second plurality of mirrors being greater than or equal a predefined friction threshold.

36. The method of claim 33, wherein the end-point for the CM' is defined as at least a reflection detected from the surface of at least one of first plurality of mirrors and second plurality of mirrors.

* * * * *

UNITED STATES PATENT AND TRADEMARK OFFICE
CERTIFICATE OF CORRECTION

PATENT NO. : 10,739,646 B1
APPLICATION NO. : 16/399373
DATED : August 11, 2020
INVENTOR(S) : Zhang et al.

It is certified that error appears in the above-identified patent and that said Letters Patent is hereby corrected as shown below:

In the Claims

| Column | Line | |
|--------|------|---|
| 12 | 4 | Please change "though" to --through-- |
| 14 | 38 | Please change "CM'" to --CMP-- |
| 14 | 43 | Please change "CM'" to --CMP-- |
| 14 | 46 | Please insert --to-- before "a" |
| 14 | 48 | Please change "CM'" to --CMP-- |
| 14 | 49 | Please insert --the-- between "of" and "first" |

Signed and Sealed this
Eleventh Day of October, 2022

Katherine Kelly Vidal
Director of the United States Patent and Trademark Office